United States Patent
Pertsel

(10) Patent No.: US 10,272,838 B1
(45) Date of Patent: Apr. 30, 2019

(54) REDUCING LANE DEPARTURE WARNING FALSE ALARMS

(71) Applicant: Ambarella, Inc., Santa Clara, CA (US)

(72) Inventor: Shimon Pertsel, Mountain View, CA (US)

(73) Assignee: Ambarella, Inc., Santa Clara, CA (US)

(*) Notice: Subject to any disclaimer, the term of this patent is extended or adjusted under 35 U.S.C. 154(b) by 529 days.

(21) Appl. No.: 14/463,960

(22) Filed: Aug. 20, 2014

(51) Int. Cl.
*B60R 11/04* (2006.01)
*B60Q 5/00* (2006.01)
*H04N 7/18* (2006.01)

(52) U.S. Cl.
CPC .............. *B60Q 5/005* (2013.01); *B60R 11/04* (2013.01); *H04N 7/183* (2013.01); *B60R 2300/804* (2013.01)

(58) Field of Classification Search
CPC ... B60Q 5/005; B60R 11/04; B60R 2300/804; H04N 7/183
See application file for complete search history.

(56) References Cited

U.S. PATENT DOCUMENTS

| | | | | | |
|---|---|---|---|---|---|
| 5,264,827 | A | * | 11/1993 | Giovanni | B60Q 1/38 340/457 |
| 5,790,050 | A | * | 8/1998 | Parker | G08G 1/0965 340/438 |
| 2005/0107939 | A1 | * | 5/2005 | Sadano | B60T 8/17557 701/70 |
| 2006/0261936 | A1 | * | 11/2006 | Widmann | B60Q 1/2665 340/435 |
| 2006/0287859 | A1 | * | 12/2006 | Hetherington | G10L 25/87 704/260 |
| 2008/0039964 | A1 | * | 2/2008 | Charoenruengkit | G11B 27/036 700/94 |
| 2010/0265325 | A1 | * | 10/2010 | Lo | B62D 15/029 348/119 |
| 2013/0054086 | A1 | * | 2/2013 | Lo | B60R 1/00 701/36 |
| 2013/0063599 | A1 | * | 3/2013 | Imai | B62D 15/025 348/148 |
| 2015/0039175 | A1 | * | 2/2015 | Martin | G06Q 40/08 701/31.5 |

(Continued)

FOREIGN PATENT DOCUMENTS

JP  2012215914 A  * 11/2012
JP  2012215914 A  * 11/2012

OTHER PUBLICATIONS

Salari et al., "Camera-based Forward Collision and Lane Departure Warning Systems Using SVM", IEEE 2013.*

*Primary Examiner* — William C Vaughn, Jr.
*Assistant Examiner* — Joseph Daniel A Towe
(74) *Attorney, Agent, or Firm* — Christopher P. Maiorana, PC

(57) ABSTRACT

An apparatus includes a video processing circuit, an audio generating circuit, and an analysis circuit. The video processing circuit may be configured to analyze a video signal to detect lane markings and to detect departure of a vehicle from a lane bounded by the lane markings. The audio generating circuit may be configured to present a lane departure warning to a driver. The analysis circuit may be configured to determine whether a lane departure detected by the video processing circuit is intentional and generate the lane departure warning in response to an unintended lane departure.

20 Claims, 9 Drawing Sheets

(56) References Cited

U.S. PATENT DOCUMENTS

2015/0039350 A1\* 2/2015 Martin ............... G06Q 30/0261
705/4

\* cited by examiner

REDUCING LANE DEPARTURE WARNING FALSE ALARMS

FIELD OF THE INVENTION

The present invention relates to driver assistance systems generally and, more particularly, to an apparatus and/or method of reducing lane departure warning false alarms.

BACKGROUND OF THE INVENTION

Driver assistance algorithms are increasingly adopted by automotive original equipment manufacturers (OEMs). Initial implementations focus on alerting drivers (i.e., lane departure warnings and front collision warnings). More advanced systems take control of a car in certain situation (i.e., adaptive cruise control and automatic braking). Driver assistance algorithms adopted by after market devices, such as dash cameras are limited to "warning only", as these after market devices do not interfere with operation of the car. Reliably recognizing unintentional lane changes without some indication of the intentions of a driver is very difficult. This leads to annoying lane departure warning false alarms when drivers intentionally change lanes and/or make a turn.

It would be desirable to reduce lane departure warning false alarms.

SUMMARY OF THE INVENTION

The present invention concerns an apparatus including a video processing circuit, an audio generating circuit, and an analysis circuit. The video processing circuit may be configured to analyze a video signal to detect lane markings and to detect departure of a vehicle from a lane bounded by the lane markings. The audio generating circuit may be configured to present a lane departure warning to a driver of the vehicle. The analysis circuit may be configured to determine whether a lane departure detected by the video processing circuit is intentional and generate the lane departure warning in response to an unintended lane departure.

The objects, features and advantages of the present invention include providing an apparatus and/or method of reducing lane departure warning false alarms that may (i) detect lane departure through video analysis, (ii) determine intentional lane changes and turns through video and/or audio analysis, (iii) inhibit lane departure warnings based on turn signal detection, (iv) be implemented independently of a vehicle information bus, and/or (v) be implemented in a dash camera or surround view system.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

In various embodiments, a lane departure warning system (LDWS) with reduced false alarms is provided. The LDWS may be implemented in dash cameras and after market surround view systems. The LDWS is generally enabled to infer driver intentions regarding lane changes/departures while having no connection to a vehicle information bus. The LDWS differs from built-in systems, such as systems installed by vehicle OEMs, which rely on information from the vehicle information bus (such as driver turning, lane change/turn indicator) to interpret driver behavior and distinguish an intentional lane change from an unwanted lane change caused by driver distraction. The LDWS also differs from conventional after market devices that operate similarly to the built-in systems by connecting through an OBD-II connector to the vehicle bus. Because connecting through the OBD-II connector involves more complex installation and additional cables, many conventional systems rely primarily on a pattern of movement/speed to distinguish between intentional and unwanted lane changes, which results in annoying false alarms. In various embodiments, a camera/vision based system in accordance with an embodiment of the invention incorporates additional information about turn/lane change signal status obtained without connecting to the vehicle OBD-II bus.

Figure 1:
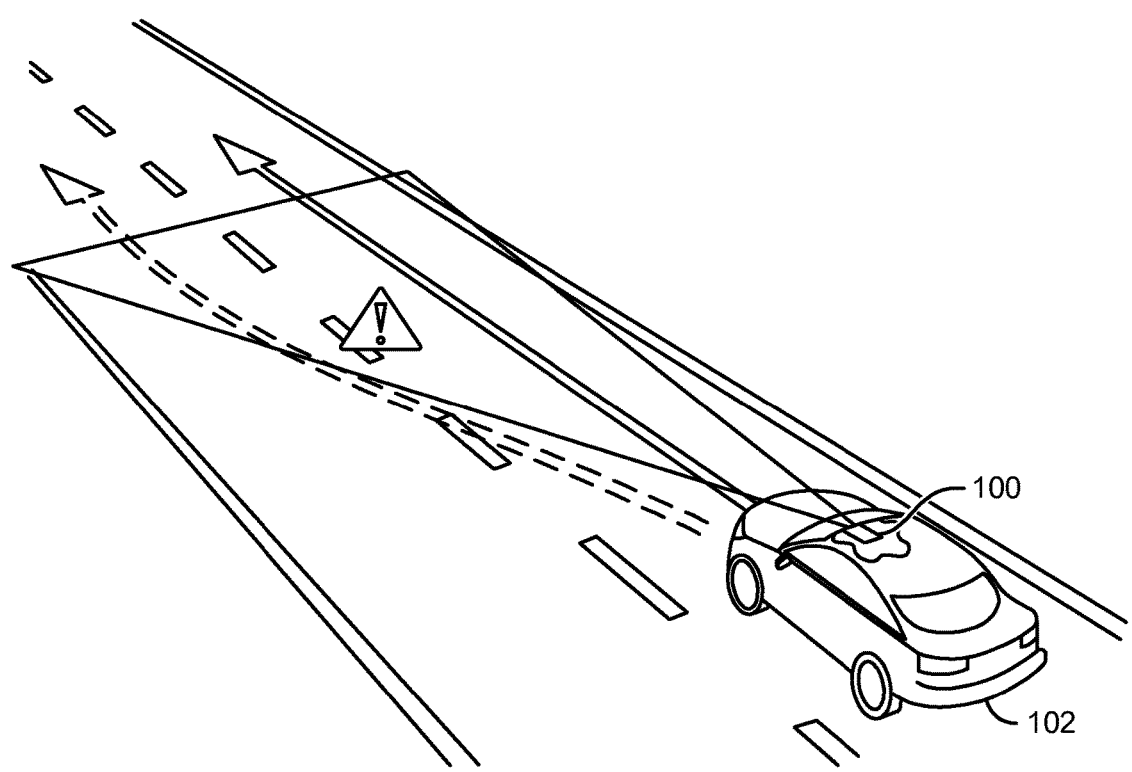
FIG. 1 is a diagram illustrating an example operation of a lane departure warning system in accordance with an embodiment of the invention.

Referring to FIG. 1, a diagram is shown illustrating an example operation of a lane departure warning system in accordance with an embodiment of the invention. In one example, a camera 100, implementing a lane departure warning system in accordance with an embodiment of the invention, is mounted in a vehicle 102 with a view of the road ahead of the vehicle 102. In various embodiments, a camera/vision based lane departure warning function of the camera 100 may be divided into two parts—a) recognizing lane markings and vehicle position relative to the lane markings and b) detecting unintended (unwanted) crossing of the lane markings based on detected lane positions and driver intentions.

In various embodiments, driver intentions may be determined using an imaging mechanism and/or an audio mechanism. The imaging mechanism may be more relevant for surround view systems. In embodiments implementing an imaging mechanism in a surround view system, cameras mounted, for example, on side mirrors of the vehicle 102 may have a view of rear side mirror lights and can rely on recognizing periodic flashing of the lights (e.g., based on certain color and/or frequency characteristics). In embodiments implementing an imaging mechanism in a dash cam, the dash cam may have a view of front fender mounted turn indicator lights and can rely on recognizing periodic flashing of the lights (e.g., based on certain color and/or frequency characteristics). The audio mechanism may be applied to both dash cameras and surround view systems. Most dash cameras have built-in microphones. The microphones record the sound inside the vehicle. By recognizing the periodic "ticking" sound produced (e.g., by turn signal relays) in most vehicles, the dash camera can identify the intention of the driver to change lanes.

Once a determination has been made that the driver has turned on the turn/lane change signal, the LDWS inhibits/suppresses warnings to the driver of a subsequent lane change, until the turn signal has been turned off. In embodiments implementing an imaging mechanism, the warnings may be suppressed only for lane departure in the direction of the activated signal. In both imaging and audio embodiments, a separate warning may be implemented to warn drivers when the turn signal has been on for a predetermined amount of time and no lane change/departure has occurred.

In some embodiments, improved driver behavior may be sought by encouraging proper turn signal use. In one example, a process may be implemented to improve driver behavior by tracking lane departures and turn signal use during trips using a vehicle camera system. Feedback may be provided to a driver when a trip ends regarding the turn signal use relative to lane departures detected. In some embodiments, a history of driver behavior may be maintained and a score provided to the driver based on tracking data of a current trip and historical data of previous trips. Feedback could also be given based on an amount time between a turn signal activation and an actual lane change. For example, thresholds could be set defining an acceptable period, and indications (e.g., lights, icons, sounds, etc.) provided for periods that are acceptable, too short, and too long. Such a system would be useful for parents with teenagers beginning to drive. The parents could monitor the driving behavior of the teenagers and the teenagers might alter their behavior because the parents are monitoring their driving. Such a system would also be useful for companies managing or employing professional drivers (e.g., limo services, taxi services, trucking companies, etc.).

Figure 2:
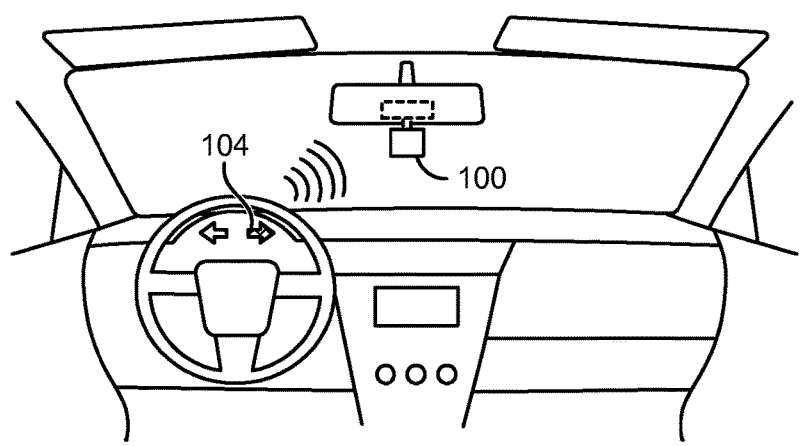
FIG. 2 is a diagram illustrating a dash camera implementing an audio turn signal detection function in accordance with an example embodiment of the invention.

Referring to FIG. 2, a diagram is shown illustrating a passenger compartment of the vehicle 102 of FIG. 1. In one example, the camera 100 may be mounted to a rearview mirror of the vehicle 102. The dashboard generally includes turn signal indicators 104. When activated, the turn signal indicators 104 flash and are accompanied by a ticking (clicking) sound (e.g., contacts in a turn signal relay opening and closing) within the passenger compartment. The camera 100 may be configured to detect the clicking sound associated with the turn signals 104 being activated, even with the presence of background noise. In one example, the camera 100 may have an audio processing circuit (e.g., a digital signal processor (DSP)) enabled to perform, for example, a spectrographic analysis of audio levels within the passenger compartment. The spectrographic analysis may be used to detect the pulses (or clicks) from the turn signal flashing relay (e.g., by looking at the audio signals recorded from the passenger compartment and picking out spikes with higher than average energy content).

Upon detection of spikes or pulses within the ambient sound recorded from the passenger compartment, the audio processing circuit may compare the frequency and/or duty cycle of the pulses with predetermined turn signal characteristics. Based upon the results of the analysis, the camera 100 may be configured to provide turn signal status to other routines connected with the lane departure warning system or inhibit (suppress) lane departure warnings from other routines or circuits associated with the lane departure warning system. For example, upon determination that the turn signals are on, a flag (bit), register, memory location, etc. may be set to a predetermined value or a signal may be asserted.

Figure 3:
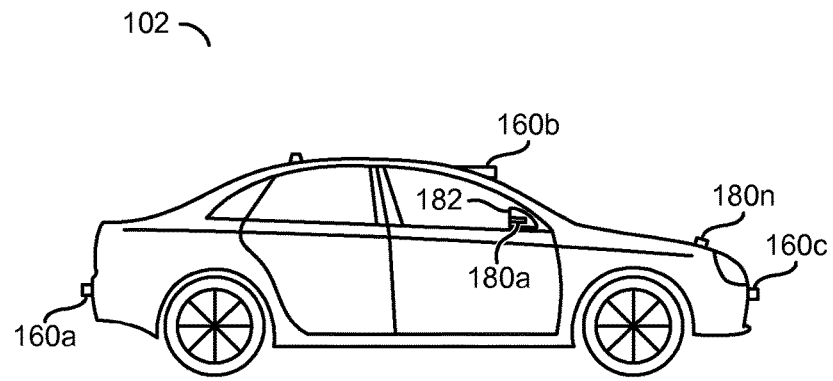
FIG. 3 is a side view of an automobile with multiple cameras implementing a visual turn signal detection function in accordance with an example embodiment of the invention.
Figure 4:
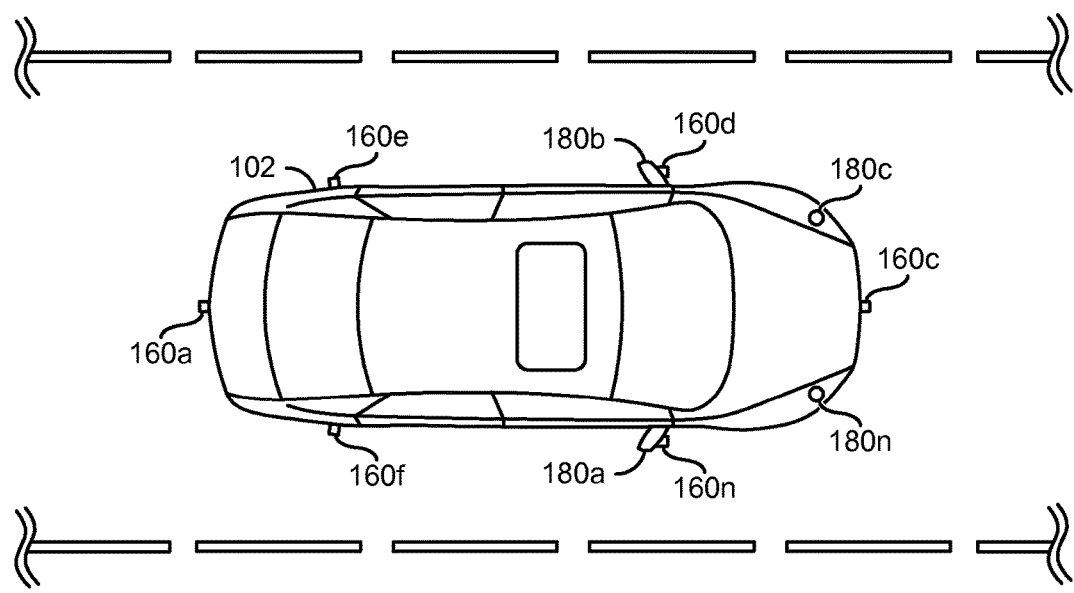
FIG. 4 is a top view of the automobile of FIG. 3.

Referring to FIGS. 3 and 4, side and top views are shown illustrating the vehicle 102 with multiple cameras of a surround view system implementing a visual turn signal detection function in accordance with an example embodiment of the invention. In FIG. 3, the vehicle 102 is shown with surround view cameras 160a, 160b, and 160c. The camera 160a may be placed to view vehicle tail lights. The camera 160b may have a view of front fender turn signal indicator 180n. The camera 160c may be placed to view front turn signal indicators of the vehicle 102. In FIG. 4, a top view is shown illustrating an example placement of additional cameras 160d, 160e, 160f, and 160n. The cameras 160d and 160n may be located on side view mirrors 182 and configured to view (image) turn signal indicators 180a and 180b on the back of the side view mirrors. The cameras 160d and 160n may be configured to view (image) turn signal indicators 180c and 180n on front fenders of the vehicle 102, as well. The cameras 160e and 160f may be configured to view (image) rear turn signal indicators of the vehicle 102. The particular number of cameras 160a-160n implemented may be varied to meet the design criteria of a particular implementation. The vehicle 102 may be described as an automobile. However, the particular type of vehicle may be varied to meet the design criteria of a particular implementation. For example, the vehicle 102 may be a truck, bus, or other type of vehicle operated by a driver.

Referring to FIG. 4, a top view of the vehicle 102 is shown illustrating cameras placed around the vehicle 102 to image lane markers and turn signals. In one example, the vehicle may have multiple cameras 160a-160n mounted around the vehicle. The cameras 160a-160n may be located on the vehicles in such a way as to be able to see various turn signal indicators 180a-180n of the vehicle, as well as the lane markers on the road. Activation (operation) of the turn signal indicators 180a-180n may be used to determine (infer) the drivers intention with regard to changing lanes and/or turning.

Figure 5:
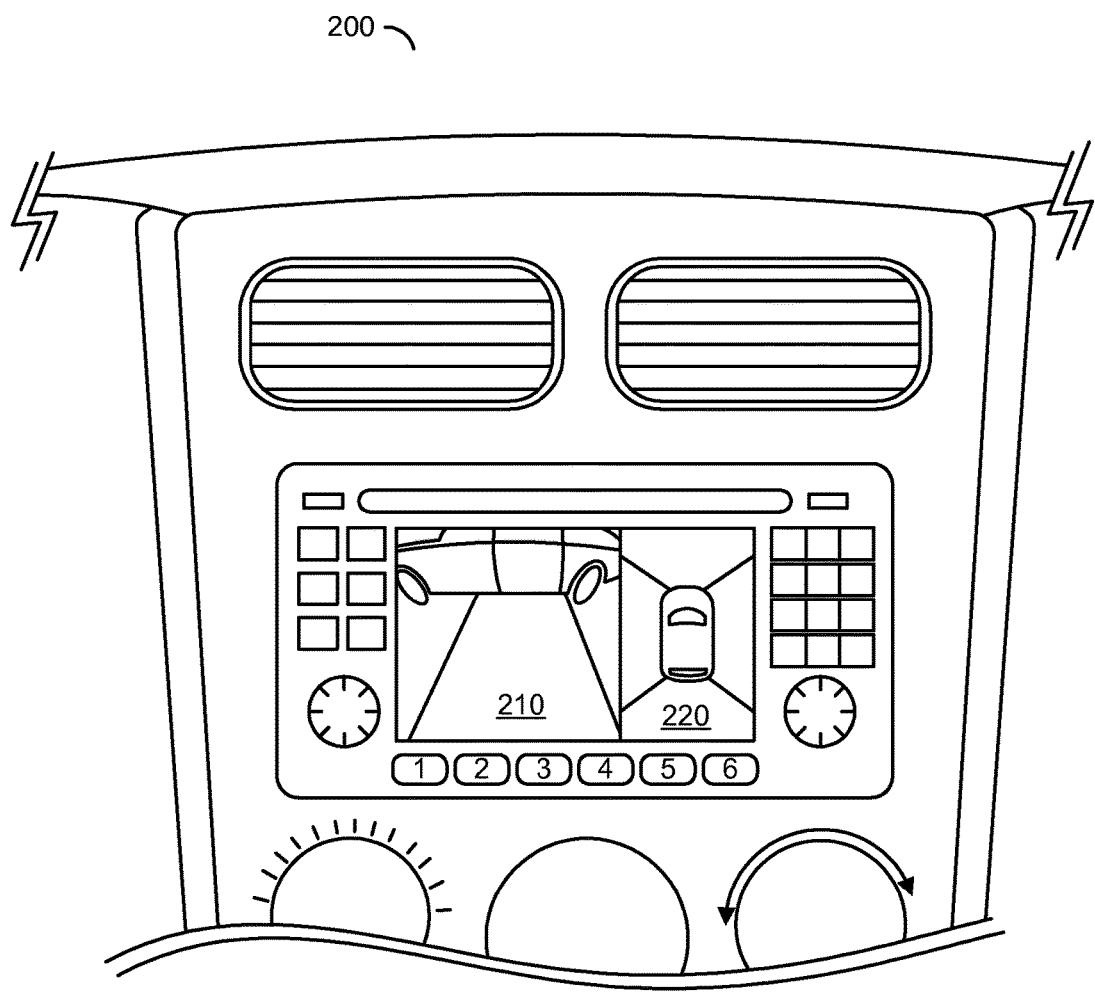
FIG. 5 is a diagram illustrating an example driver information center.

Referring to FIG. 5, a diagram of a dashboard 200 is shown. The dashboard 200 includes a display 210 and a display 220. The dashboard 200 may be located so that the display 210 and the display 220 are at a conveniently viewable location when the driver of the vehicle 102 is driving. While a two screen system is shown, a one screen system or a multi-screen system may be implemented. In some embodiments, a visual lane departure warning may also be presented using one or both of the displays 210 and 220. In one example, if an unintended lane departure is detected on either side of the vehicle 102, a bird's eye view may be presented highlighting the departure. A view from the side of the vehicle on which the departure is detected may also be presented if the speed is below a certain threshold.

Figure 6:
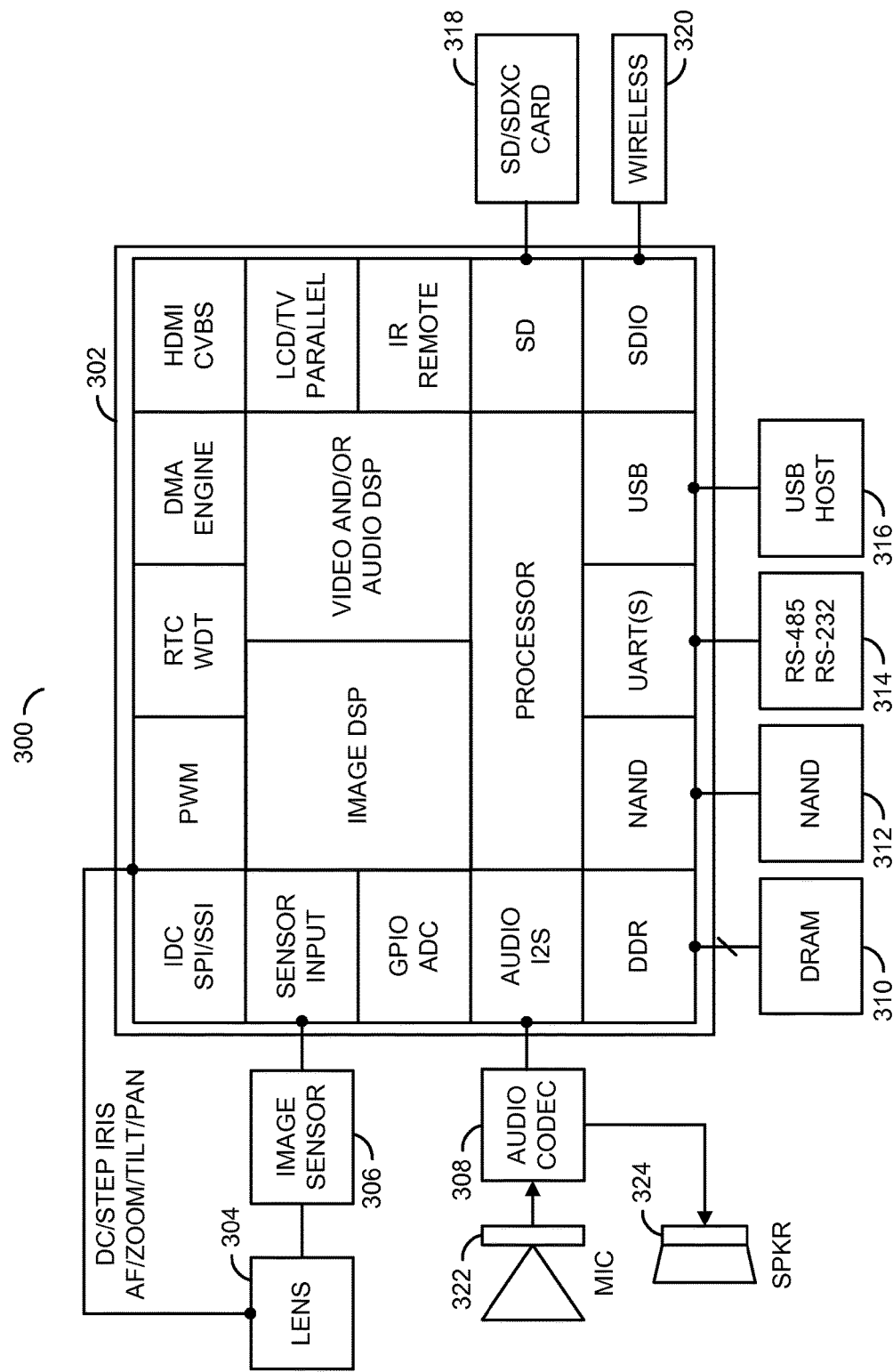
FIG. 6 is a diagram illustrating an example implementation of the video camera/recorder system of FIGS. 1 and 2.

Referring to FIG. 6, a block diagram of a camera system 300 is shown illustrating an example implementation of a camera/recorder system in accordance with an embodiment of the present invention. In one example, the electronics of the camera system 300 may be implemented as one or more integrated circuits. For example, an application specific integrated circuit (ASIC) or system on chip (SOC) may be used to implement a processing portion of the camera system 300. In various embodiments, the camera system 300 may comprise a camera chip (or circuit) 302, a lens assembly 304, an image sensor 306, an audio codec 308, dynamic random access memory (DRAM) 310, non-volatile memory (e.g., NAND flash memory, etc.) 312, one or more serial interfaces 314, an interface 316 for connecting to or acting as a USB host, an interface for connecting to a removable media 318 (e.g., SD, SDXC, etc.), a wireless interface 320 for communicating with a portable user device, a microphone 322 for recording audio from the passenger compartment, and a speaker 324 for communicating warnings to the driver. In some embodiments, the lens assembly 304 and image sensor 306 may be part of a separate camera that is connected to the processing portion of the system 300 (e.g., via a video cable, a HDMI (high definition media interface) cable, a USB (universal serial bus) cable, an ethernet cable, or wireless link).

In various embodiments, the circuit 302 may comprise a number of modules including, but not limited to, a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infra-red (IR) remote interface, a secure digital input output (SDIO) interface module, an SD card interface, an audio I'S interface, an image sensor interface, and a synchronous data communications interface (e.g., IDC SPI/SSI). The circuit 302 may also include an embedded processor (e.g., ARM, etc.), an image digital signal processor (DSP), and a video and/or audio DSP. In embodiments incorporating the lens assembly 304 and image sensor 306 in the system 300, the circuit 302 may be configured (e.g., programmed) to control the lens assembly 304 and receive image data from the sensor 306. The wireless interface 320 may include support for wireless communication by one or more wireless protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, and IEEE 802.20. The circuit 302 may also include support for communicating using one or more of the universal serial bus protocols (e.g., USB 1.0, 2.0, 3.0, etc.). The circuit 302 may also be configured to be powered via the USB connection. However, other communication and/or power interfaces may be implemented accordingly to meet the design criteria of a particular implementation.

In various embodiments, programming code (e.g., executable instructions for controlling various processors of the circuit 302) implementing a lane departure warning system and driver intention detection in accordance with an embodiment of the invention may be stored in one or more of the memories 310 and 312. The programming code implementing the lane departure warning system portion may be implemented using conventional lane departure warning techniques, as well as allow improvements to the conventional techniques and future techniques to be implemented using the circuit 302. The programming code may also include routines for inferring driver intentions through turn signal detection, for device calibration, and for driver training in accordance with embodiments of the invention.

Figure 7A:
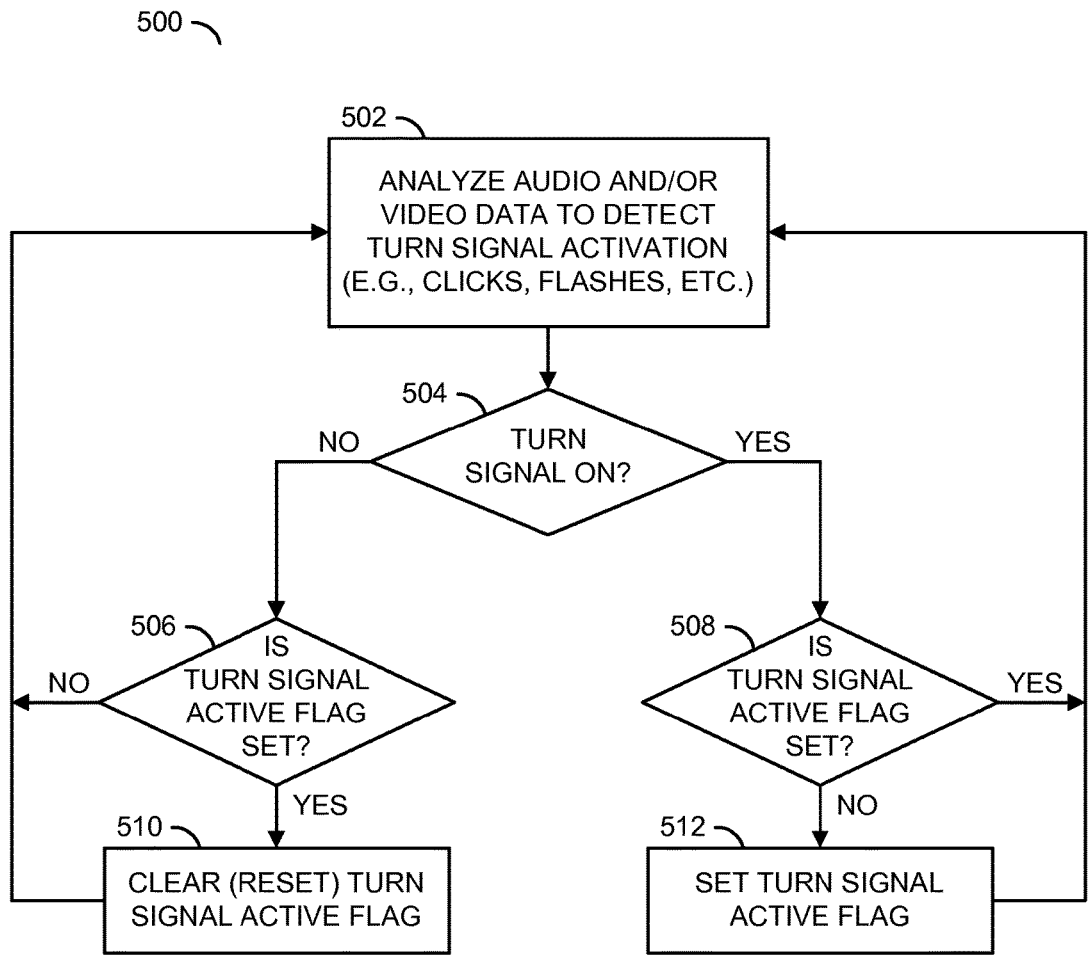
FIGS. 7A and 7B are flow diagrams illustrating a lane departure warning process in accordance with an example embodiment of the invention.
Figure 7B:
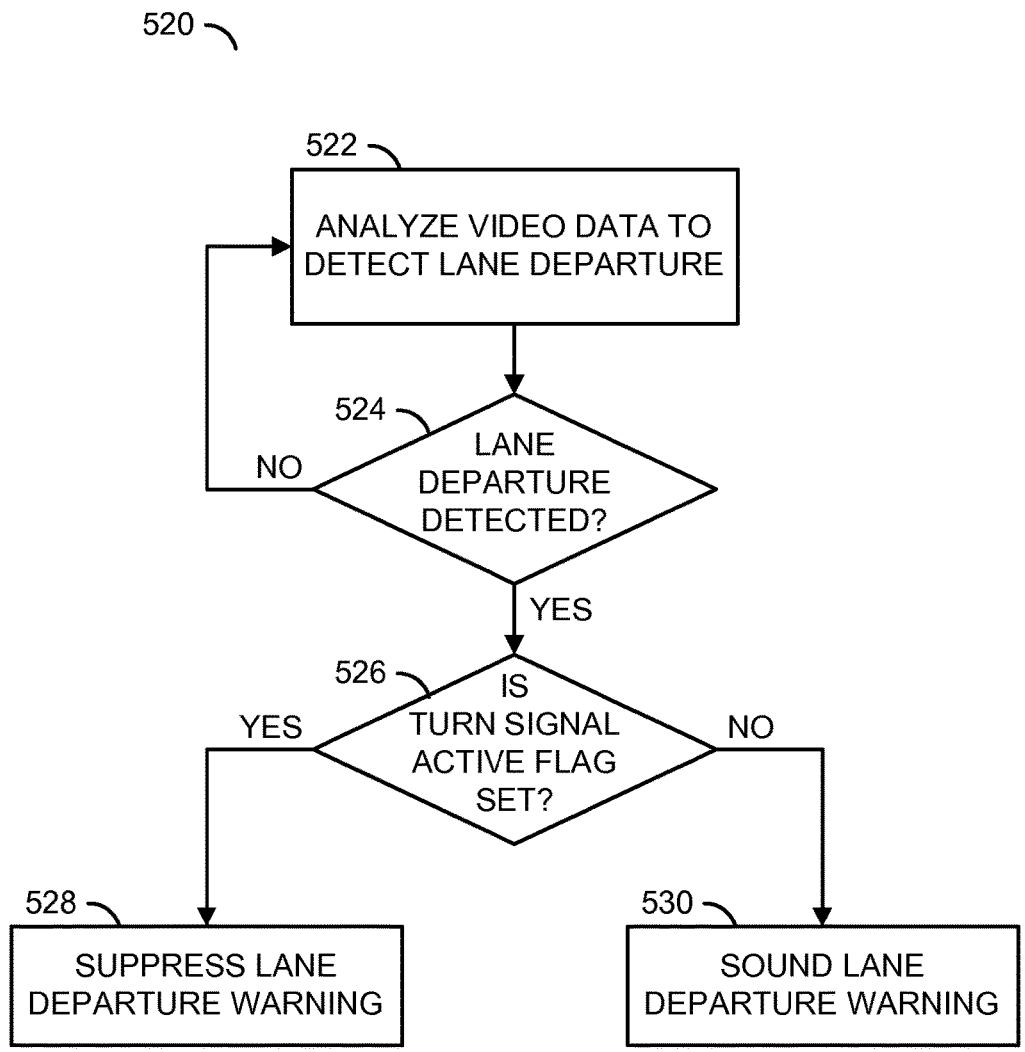

Referring to FIGS. 7A and 7B, flow diagrams illustrating a lane departure warning process in accordance with an example embodiment of the invention are shown. In various embodiments, the lane departure warning process (or method) may be implemented with a turn signal detection process 500 and a lane departure warning process 520. In one example, the processes 500 and 520 may be implemented as two processor threads. The process (or method) 500 may be configured to detect turn signal activity in order to infer driver intention. The process (or method) 520 may be configured to detect lane departures. In one example, the processes 500 and 520 may be run in parallel.

Referring to FIG. 7A, the process 500 may comprise a step (or state) 502, a decision step (or state) 504, a decision step (or state) 506, a decision step (or state) 508, a step (or state) 510, and a step (or state) 512. In the state 502, the process 500 analyzes audio and/or video data to detect turn signal operation (e.g., by detecting clicks, flashes, etc.). For example, the step 502 may be enabled to detect patterns of the ticking sound associated with turn signals (widely available in the automotive field), as well as certain frequency of repeats (e.g., 1 Hz, etc.) and flashes of certain colors. In the step 504, the process 500 determines whether a turn signal is activated. If the turn signals are not activated, the process 500 moves to the decision step 506. If at least one of the turn signals is activated, the process 500 moves to the decision step 508.

In the decision step 506, the process 500 determines whether a turn signal active flag is set. If the turn signal active flag is not set, the process 500 returns to the step 502. If the turn signal active flag is set, the process 500 moves to the step 510 where the turn signal active flag is cleared, and then returns to the step 502. In the decision step 508, the process 500 checks whether the turn signal active flag is set. If the turn signal active flag is set, the process 500 returns to the state 502. If the turn signal active flag is not set, the process 500 moves to the step 512 and turns the turn signal active flag on. The process 500 then returns to the step 502.

Referring to FIG. 7B, the process 520 may comprise a step (or state) 522, a decision step (or state) 524, a decision step (or state) 526, a step (or state) 528, and a step (or state) 530. In the step 522, the process 520 analyzes video (image) data to detect lane departure. In the decision step 524, the process 520 checks whether a lane departure has been detected. If no lane departure has been detected, the process 520 returns to the state 522 to continue analyzing the video (image) data. If a lane departure is detected, the process 520 moves to the decision step 526. In the decision step 526, the process 520 determines whether a turn signal is activated (e.g., turn signal active flag is set, etc.). If the turn signal active flag is set, the process 520 moves to the step 528 and suppresses a lane departure warning. If the turn signal active flag is not set, the process 520 moves to the state 530 and sounds a lane departure warning to alert the driver to the lane departure.

Figure 8:
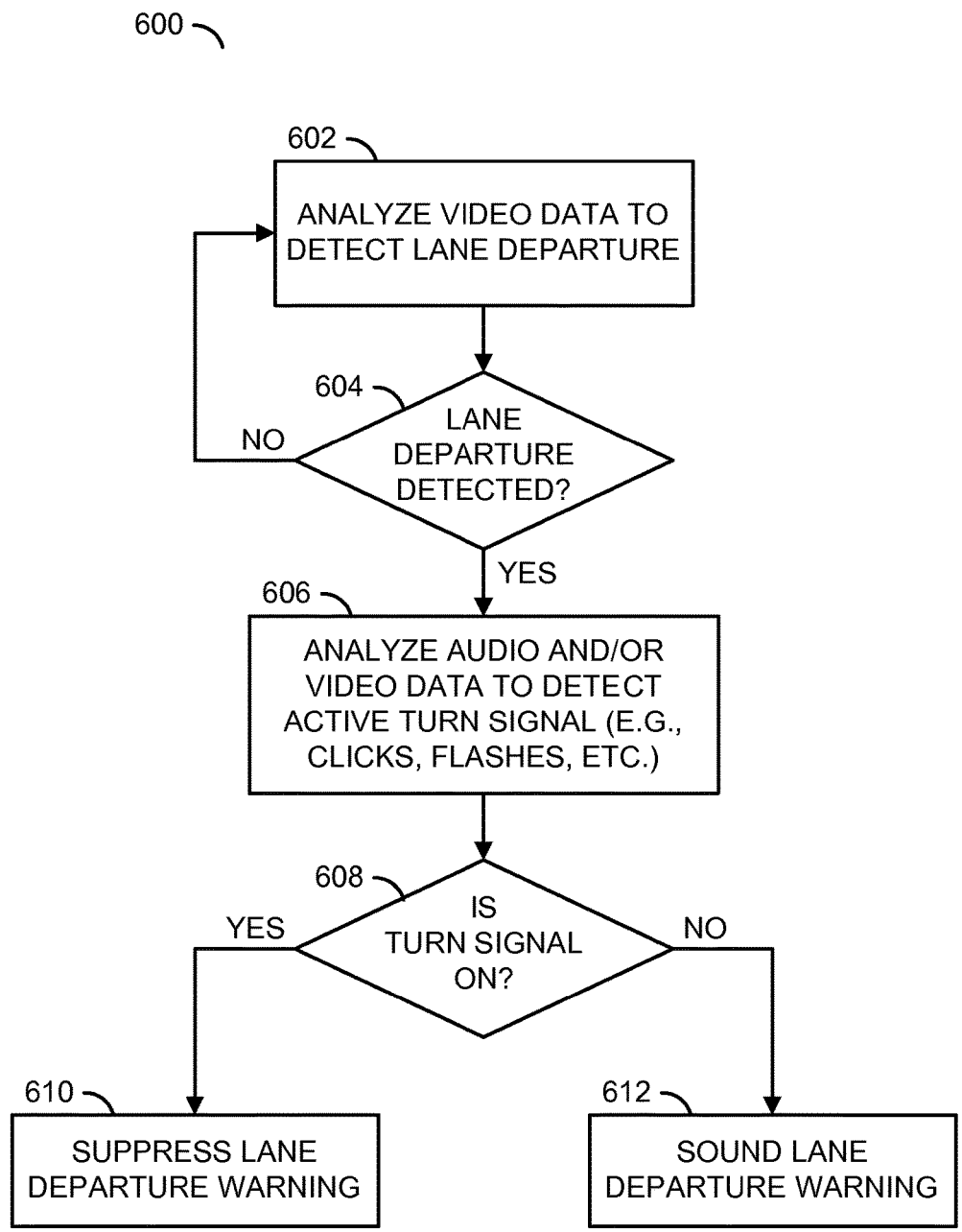
FIG. 8 is a flow diagram illustrating a lane departure warning process in accordance with another example embodiment of the invention.

Referring to FIG. 8, a flow diagram is shown illustrating a lane departure warning process in accordance with an example embodiment of the invention. In various embodiments, a lane departure warning process (or method) 600 comprises a step (or state) 602, a decision step (or state) 604, a step (or state) 606, a decision step (or state) 608, a step (or state) 610, and a step (or state) 612. In the state 602, the process 600 analyzes video (or image) data to detect lane departure conditions. In the decision step 604, the process 600 determines whether a lane departure has been detected. If a lane departure has not been detected, the process 600 returns to the step 602. If lane departure has been detected, the process 600 moves to the step 606.

In the step 606, the process 600 analyzes audio and/or video data to determine whether the driver intends to change lanes or turn (e.g., checking for an active turn signal). In the decision step 608, the process 600 checks whether the driver intends to change lanes or turn (e.g., turn signal is on). If the process 600 determines the driver intends to change lanes or turn, the process 600 moves to the step 610. If the process 600 determines the lane change or turn is not intended, the process 600 moves to the step 612. In the step 608 in some embodiments, the process 600 may also check whether the lane departure is in a direction associated with an active turn signal before deciding whether to move to the step 610 or the step 612. In the step 610, the process 600 suppresses a lane departure warning. In the step 612, the process 600 sound a lane departure warning.

Figure 9:
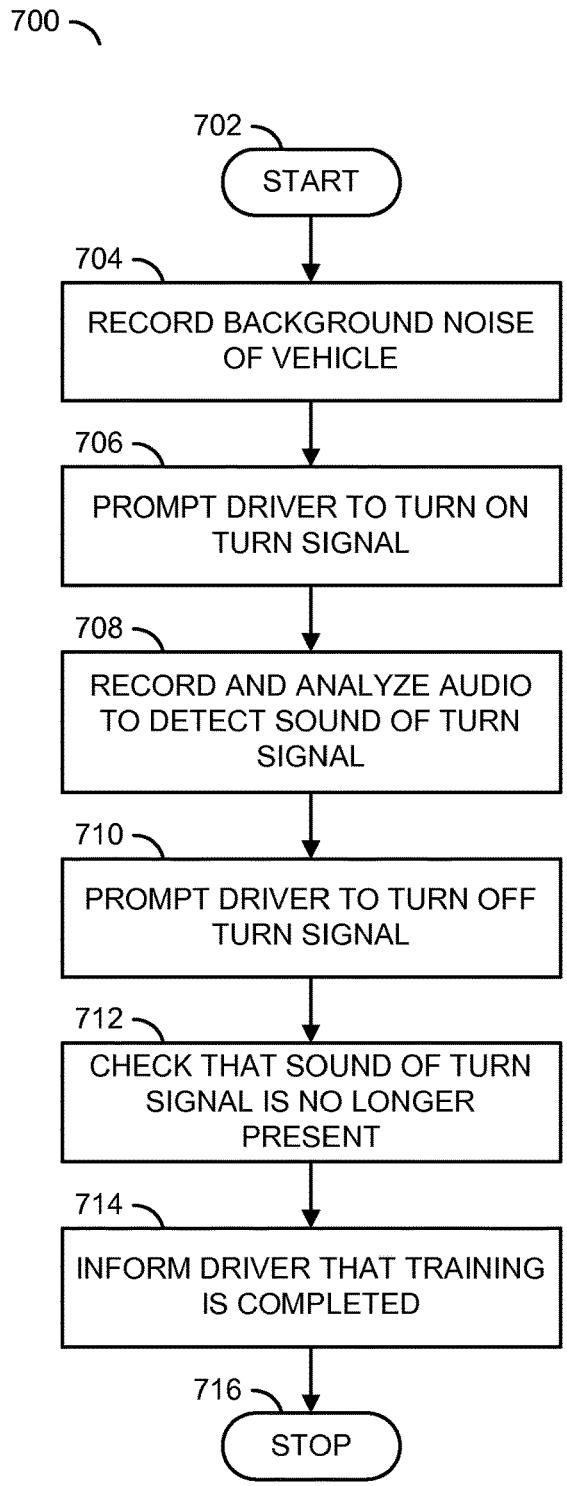
FIG. 9 is a flow diagram illustrating a training process for an audio mechanism in accordance with an example embodiment of the invention.

Referring to FIG. 9, a flow diagram is shown illustrating a training process in accordance with an example embodiment of the invention. When installing a device with a lane departure warning system including an audio mechanism in accordance with an embodiment of the invention, a user may perform a turn signal detection training (calibration) procedure (or method) 700. In one example, the training procedure 700 may be part of an installation process. In another example, the device may prompt the user to perform the training procedure 700 when first turned on. In some embodiments, because the acoustic environment of a vehicle can change over time (e.g., effectiveness of noise insulation can decrease, change in tires may increase road noise, etc.), the device may be configured to prompt the user to recalibrate the device periodically.

In some embodiments, the process 700 may comprise a start step (or state) 702, a step (or state) 704, a step (or state) 706, a step (or state) 708, a step (or state) 710, a step (or state) 712, a step (or state) 714, and a step (or state) 716. The process 700 may begin in the start step 702 and proceed to the step 704. In the step 704, the process 700 begins recording ambient (background) sound levels of the passenger compartment of a vehicle. In the step 706, the process 700 prompts a driver to turn a turn signal ON. Since left and right turn signals would generally produce similar sounds, right or left generally need not be specified. In the step 708, the process 700 records and analyses the sounds from the passenger compartment of a vehicle to detect (learn) particular characteristics of the ticking sounds corresponding to the turn signals of the vehicle.

When the ticking sounds corresponding to the turn signals are detected, the process 700 may proceed to the step 710 where the driver is instructed to turn the turn signal OFF. In the step 712, the process 700 may check that the ticking sound previously detected is no longer present. In some embodiments, the steps through 712 may be repeated for a number of iterations to improve detection accuracy and/or accommodate varying noise levels of the passenger compartment. For example, the process 700 may include a number of phases with varying noise (e.g., quiet, talking, radio on, vehicle moving, etc.) while the audio turn signal detection is performed. In the step 714, the process 700 may inform the driver the training is completed. For example, the process 700 may inform the user using a light, icon, sound, prompt, etc. when training is successful (e.g., predetermined criteria have been met). The process 700 may then move to the step 716 and end. Other training protocols may be implemented to meet the design criteria of a particular implementation.

Figure 10:
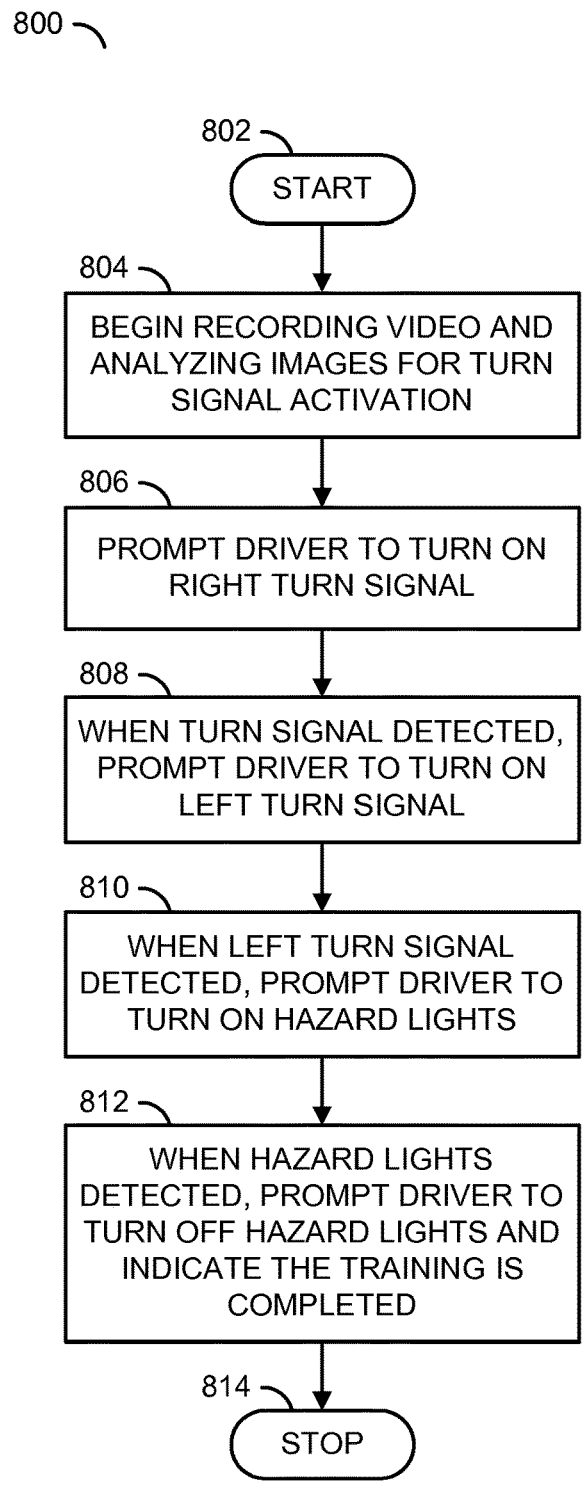
FIG. 10 is a flow diagram illustrating a training process for an imaging mechanism in accordance with an example embodiment of the invention.

Referring to FIG. 10, a flow diagram is shown illustrating a training process in accordance with an example embodiment of the invention. When installing a device with a lane departure warning system including an imaging mechanism in accordance with an embodiment of the invention, a user may perform a turn signal detection training (calibration) procedure (or method) 800. In one example, the training procedure 800 may be part of an installation process. In another example, the device may prompt the user to perform the training procedure 800 when first turned on. In some embodiments, the device may be configured to prompt the user to recalibrate the device periodically to assure accurate detection of the turn signal indicators.

In some embodiments, the process 800 may comprise a start step (or state) 802, a step (or state) 804, a step (or state) 806, a step (or state) 808, a step (or state) 810, a step (or state) 812, and a step (or state) 814. The process 800 may begin in the start step 802 and proceed to the step 804. In the step 804, the process 800 begins recording video and analyses the video for activation of the turn signals of a vehicle. In the step 806, the process 800 prompts a driver to turn a turn signal (e.g., the right turn signal) ON. In the step 808, the process 800 records and analyses the video images to detect (learn) particular characteristics of the particular turn signal of the vehicle. When the turn signal is detected, the process 800 instructs the driver to turn the other (e.g., left) turn signal ON and moves to the step 810. In the step 810, the process 800 records and analyses the video images to detect (learn) particular characteristics of the other turn signal of the vehicle. When the turn signal is detected, the process 800 instructs the driver to turn the hazard lights (or 4-way flashers) ON and moves to the step 812. In the step 812, when the hazard lights are detected, the process 800 may inform the driver to turn the hazard lights OFF and indicate the training is completed. For example, the process 800 may inform the user the training is completed using a light, icon, sound, prompt, etc. when training is successful (e.g., predetermined criteria have been met). The process 800 may then move to the step 814 and end. Other training protocols may be implemented to meet the design criteria of a particular implementation.

In embodiments implementing a visual mechanism for detecting turn signal activation, a device in accordance with an embodiment of the invention may prompt the user to turn on each particular turn signal while images of the turn signal indicators are being analyzed. The device may be configured to provide feedback to the user regarding whether a turn signal indicator has been detected and which turn signal indicator(s) (e.g., right, left, hazard, front, back, etc.) were detected. The device may inform the user (e.g., light, icon, sound, prompt, etc.) when training has been successful (e.g., predetermined criteria have been met).

The functions illustrated by the diagrams of FIGS. 7A, 7B, 8, 9, and 10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a video processing circuit;
   an audio generating circuit; and
   an analysis circuit, wherein (a) said video processing circuit is configured to analyze a video signal to detect lane markings and to detect departure of a vehicle from a lane bounded by the lane markings, (b) said audio generating circuit is configured to present a lane departure warning to a driver of the vehicle, and (c) the analysis circuit is configured to (i) determine whether a lane departure detected by the video processing circuit is intentional based on at least one of said video processing circuit detecting an activated turn signal indicator through analysis of video data from said video signal and an audio processing circuit detecting said activated turn signal indicator through analysis of audio data collected from within a passenger compartment of the vehicle, wherein detecting said activated turn signal indicator through analysis of said audio data comprises detecting a ticking sound attributable to operation of said turn signal indicator by performing a spectrographic analysis to detect pulses with a higher than average energy content, (ii) inhibit the lane departure warning in response to an intended lane departure, and (iii) generate the lane departure warning in response to an unintended lane departure.

2. The apparatus according to claim 1, wherein said analysis circuit determines whether a lane departure detected by the video processing circuit is unintended based on information obtained independently of a vehicle information bus.

3. The apparatus according to claim 1, wherein said apparatus is part of a dash camera.

4. The apparatus according to claim 1, wherein said apparatus is part of a surround view system.

5. The apparatus according to claim 1, wherein said apparatus recognizes an activated turn signal indicator through visual or audible indications.

6. The apparatus according to claim 1, further comprising using visual or audio information indicative of an activated turn signal indicator as an input to inhibit lane departure warnings.

7. The apparatus according to claim 1, wherein said analysis circuit is further configured to issue a warning when a period of operation of the turn signal indicator exceeds a predetermined threshold and no lane departure has been detected.

8. The apparatus according to claim 1, further comprising one or more video cameras configured to image turn signal indicators of said vehicle, wherein at least one of said video processing circuit and said analysis circuit is further configured to detect operation of the turn signal indicators.

9. The apparatus according to claim 1, wherein said analysis circuit is further configured to suppress the lane departure warning for lane departures in a direction corresponding to an active turn signal indicator.

10. The apparatus according to claim 1, wherein:
    said audio processing circuit is configured to analyze an audio signal from a microphone configured to detect sounds indicative of an activated turn signal indicator.

11. A method of reducing lane departure warning false alarms comprising the steps of:
    detecting a lane departure using at least one of a dash camera or a vehicle camera system;
    determining whether said lane departure is intentional by detecting an activated turn signal indicator through at least one of (i) analysis of video data from a video signal from said dash camera or said vehicle camera system or (ii) analysis of audio levels collected from within a passenger compartment of the vehicle, wherein determining whether said lane departure is intentional further comprises detecting a ticking sound attributable to operation of said turn signal indicator by performing a spectrographic analysis to detect pulses with a higher than average energy content;
    if said lane departure is unintentional, warning a driver of said lane departure; and
    if said lane departure is intentional, inhibiting said lane departure warning.

12. The method according to claim 11, wherein determining whether said lane departure is intentional comprises:
    detecting a flashing turn signal indicator.

13. The method according to claim 11, wherein determining whether said lane departure is intentional further comprises:
    determining whether the detected lane departure is in a direction corresponding to the activated turn signal indicator.

14. The method according to claim 11, wherein detecting said ticking sound attributable to operation of said turn signal indicator further comprises:
    analyzing audio data recorded in said passenger compartment of said vehicle.

15. The method according to claim 11, wherein detecting said ticking sound attributable to operation of said turn signal indicator further comprises:
    comparing a frequency of pulses with the higher than average energy content with predetermined turn signal characteristics obtained using a training process performed by a driver of said vehicle during installation of said dash camera or said vehicle camera system.

16. The method according to claim 11, further comprising:
during installation of said dash camera or said vehicle camera system, prompting a driver of said vehicle to perform a calibration routine to train said dash camera or said vehicle camera system about audible or visible characteristics associated with activated turn signal indicators of said vehicle, wherein determining said audible or visible characteristics associated with said activated turn signal indicators of said vehicle comprises detecting said ticking sound or an appearance of said activated turn signal indicator through analysis of said video data from said dash camera or said vehicle camera system or analysis of audio data collected from within said passenger compartment of the vehicle before and after prompting said driver to activate or deactivate the turn signal indicators.

17. A method of improving driver behavior comprising:
tracking lane departures and turn signal use during a trip using a vehicle camera system or a dash camera, wherein lane departures and activated turn signal indicators are detected through analysis of video data from said vehicle camera system or said dash camera, or said activated turn signal is detected through analysis of audio data collected from within a passenger compartment of the vehicle, said analysis of said audio data comprising detection of a ticking sound attributable to operation of said turn signal indicators by performing a spectrographic analysis to detect pulses with a higher than average energy content; and
providing feedback to a driver regarding said turn signal use in relation to said lane departures when said trip ends.

18. The method according to claim 17, further comprising:
maintaining a history of driver behavior; and
providing a score to said driver based on tracking data of a current trip and historical data of previous trips.

19. The method according to claim 16, wherein said calibration routine is repeated for a number of iterations with varying noise levels in the passenger compartment.

20. The apparatus according to claim 1, further comprising one or more displays, wherein in response to detection of said unintended lane departure on either side of said vehicle, a visual lane departure warning is presented to said driver comprising one or more of a bird's eye view highlighting the lane departure or a view from a side of the vehicle on which the lane departure is detected.

* * * * *